United States Patent [19]

Carlson

[11] Patent Number: 5,273,725
[45] Date of Patent: Dec. 28, 1993

[54] METAL AND FLUORINE VALUES RECOVERY FROM MINERAL ORE TREATMENT

[75] Inventor: Bryan J. Carlson, Johnson City, Tex.

[73] Assignee: Eco Tek, Inc., Erwin, Tenn.

[21] Appl. No.: 891,167

[22] Filed: May 29, 1992

[51] Int. Cl.$^5$ .............................. C01G 56/00
[52] U.S. Cl. ..................... 423/11; 423/122; 423/3
[58] Field of Search ............. 423/18, 20, 3, 11, 6, 423/7, 122

[56] References Cited

U.S. PATENT DOCUMENTS

| | | | |
|---|---|---|---|
| 3,937,783 | 2/1976 | Wamser et al. | 423/8 |
| 4,041,137 | 8/1977 | Abe et al. | 423/489 |
| 4,098,866 | 6/1978 | Carnahan et al. | 423/7 |
| 4,247,522 | 1/1981 | Pyman et al. | 423/8 |
| 4,599,221 | 7/1986 | Ketzinel et al. | 423/7 |
| 4,968,504 | 11/1990 | Rourke | 423/7 |
| 5,023,059 | 6/1991 | Bielecki et al. | 423/9 |
| 5,084,253 | 1/1992 | Pollock et al. | 423/65 |

*Primary Examiner*—Donald P. Walsh
*Assistant Examiner*—Anthony R. Chi

[57] ABSTRACT

The process for converting water insoluble, hazardous materials of high mineral content containing, e.g., substantial metal values of one or more of Ca, Ta, Nb, Mn, Mg, Al or the like to valuable nonhazardous products or discard, wherein the material also contains substantial fluorine values and radionuclide values assaying above about 30 pCi/g, the process having the steps of contacting the materials with an acidic aqueous system or digest medium containing boric acid and an acid component containing one or more other mineral acids, the ratio of the system (Liters) to the material (Kg) ranging from about 2/1 to about 20/1, the total concentrations of all of the acids being sufficient to solubilize selected ones of the metal values at commercially acceptable rates, the contacting being carried out for a period of time and at temperatures sufficient to solubilize at least the fluorine and uranium values into a digest liquor, separating the uranium values from the digest liquor to give substantially purified uranium values, and contacting the resulting raffinate liquor with cation reactant to form and precipitate fluoride salt product, the salt product and the raffinate liquor both having radionuclide values assays of less than about 30 pCi/g.

28 Claims, 2 Drawing Sheets

METAL AND FLUORINE VALUES RECOVERY FROM MINERAL ORE TREATMENT

FIELD OF THE INVENTION

This invention concerns the processing of various mineral-containing materials, i.e., mineral ores or the processing tailings thereof such as relatively insoluble residues or the solubilized raffinate or waste streams or the like generated during the production of metals or non-metals from their ores. The invention particularly concerns the processing of such materials in the form of matrices which are difficult to solubilize and contain relatively substantial radionuclide values and fluorine values essentially entrapped therein. The present processing, in one primary embodiment, is intended to diminish markedly the radioactivity levels in useful non-radionuclide product or in final discard derived from the present processing, which product can be safely handled by subsequent users, and which discard can meet chemical landfill quality standards, i.e., non-hazardous status. The present invention is especially adapted to isolate fluorine values, e.g., as fluorine values, and radionuclide values for recovery, and is particularly suited to the efficient treatment of calcium fluoride sediments derived from ore treatment tailings or wastes which have received one or more HF digestions or other treatments followed by lime neutralization.

BACKGROUND OF THE INVENTION

The production of many metals or useful metal-containing compounds from ores, for example, tin from cassiterite, tantalum and niobium from tantalite/columbite ores, scandium from thortveitate, uranium from pitchblend or uraninite, and rare-earth elements from monazite or bastnasite, typically employs at some point in the production process or in the treatment of tailings therefrom, a hydrofluoric acid digestion, leach or the like. Such treatment is often necessary to convert the myriad of different components including insoluble minerals, metals or compounds thereof, including various radionuclides, such as their oxides, halides, carbonates, fluorides, phosphates, sulfates or the like to species which are soluble in aqueous systems such that they can be separated out by selective precipitations, extractions or the like. The insolubilities of these components are often magnified by the refractory or inaccessible crystalline nature or the material, i.e., the matrix in which these components are occluded, entrapped or chemically incorporated, thus necessitating the drastic and extensive HF treatment. Also, in many such processes, HF or other fluorine containing reactant is employed for converting one species to another, such as the conversion of various oxides of uranium to the highly soluble $UF_6$. The result of these HF treatments is that somewhere in the processing operations, whether primary ore manufacture or tailings processing, the massive and extremely deleterious HF levels must be neutralized, typically and conveniently with lime. Such neutralization, of course, produces large quantities of insoluble calcium fluoride waste sediment or sludge which either physically entraps or chemically incorporates into its crystal lattice residual but significant quantities of valuable metals including radionuclides such as uranium and thorium, as well as bringing down large and valuable fluorine values. The typical fluorine values in these sediments by weight, dry basis, are from about 35% to about 45%, and for each of uranium, thorium, tantalum, and niobium about 0.1%. Greater or lesser concentrations of these elements, or different metal species may be found depending on the type of metal ore and processing operation involved. It is noted that the quantities of HF needed in various ore treatment operations around the world is enormous as well as expensive, and thus, fluorine values recovery is a very important consideration in any process directed to the treatment of ore, per se, or of ore processing tailings or waste material or streams.

In this regard many ores, per se, depending on their geographical sources, as well as the residual wastes from their processing into metals or compounds thereof naturally contain substantial fluorine values, for example, fluorite, cryolite, fluorapatite, sellalite, topaz, villiaumite and bastnasite contain fluorine values ranging up to about 50% by weight, and often contain substantial radionuclide values. It is noted that in many instances the initial ore may contain only relatively low concentrations of radionuclide materials but during processing of the ore by flotation, sedimentation, extraction, chemical precipitation, evaporation or the like operations, the level of radionuclide materials and also of fluorine values can become concentrated and raised substantially, e.g., assaying at least above about 30 pCi/g, and often much higher.

In recovering the various metal and non-metal components therefrom, the ore is typically digested in an acid such as $H_2SO_4$, HCl, $HNO_3$ or even HF and substantial fluorine values are liberated, usually as HF. Thus, the recovery of these fluorine values becomes an important consideration whether the values are naturally occurring in the ore or man-made; but, incident thereto, a two-fold problem, discussed in detail below, exist. These problems which are associated with ore processing waste treatment operations derive from the fact that the fluorine values must be recovered in an economical manner while concurrently reducing the radionuclide levels therein and in final residue or discard to chemical landfill quality, and also, preferably while recovering the radionuclide values, particularly uranium.

For the ore treatment scenario discussed above, certain valuable metal ores come into the production plant with substantial radionuclide values, for example, tantalum and niobium-bearing materials may contain up to about 1.0% by weight uranium and thorium, with associated daughter products in equilibrium. When the ores are digested, for example, with HF, the various radionuclide values typically do not mobilize into the liquor in an efficient and consistent manner. Therefore, the final ore processing residues or tailings contain substantial quantities of uranium and thorium as insoluble fluorides, and other insoluble metal fluorides such as scandium. The relatively high radionuclide content creates a large problem to the disposal of such residues in that their classification according to Federal Regulations is not chemical waste but hazardous nuclear waste. Typically, the fluoride content in the aforementioned ore residues can range up to about 30% by weight or higher. Other typical metals which are present in the residues include: calcium, 15%, aluminum, 5%; zirconium, 2%; tantalum, 1.2%; niobium, 1.7%; and scandium, 0.15%, the percentages being on dry basis. These fluoride-bearing ore residues which often having radioactivity levels of well above 30 pCi/g, are usually impounded at the plant site until a determination can be made concerning their disposition.

As mentioned above and as is discussed hereinafter in greater detail, the relatively insoluble mineral fluoride matrices resulting from the treatment of ore residues and sediments described above typically have been treated heretofore with sulfuric acid at elevated temperatures. In this process, hydrofluoric acid is formed and liberated. With the fluoride removed as HF, the various metals within the matrix are converted to soluble sulfates which can then be dissolved in an aqueous solution and removed by extraction, precipitation, or other techniques. The purpose of such metal recovery is to generate revenue, e.g., from scandium, yttrium, or other valuable metals or to decontaminate solids, i.e., remove uranium, thorium or radium to obviate the premium charged for radioactive waste disposal.

DISCUSSION OF THE PRIOR ART

Heretofore, an integrated system dedicated to solving the aforestated two-fold problem has not been directly addressed as will become evident from the following discussion concerning specific prior processing systems for ore or for ore waste or tailings.

In U.S. Pat. No. 5,023,059 a process is disclosed for the recovery of metal values such as columbium (Nb), tantalum, thorium and uranium. The recovery of the Ta, Nb metal values is the first step of the process and a digestion of the sludge is made with HF to isolate the Ta, Nb values in a liquid stream from insoluble digest residues which contain the U, Th and other metal values. Consequently, the digest residue, as mentioned above, is roasted with $H_2SO_4$ to solubilize the U and Th values. This roasting also releases gaseous HF which must be handled quickly, with great care and at great expense. Also, experience has shown that for refractory $CaF_2$ type matrices, the $H_2SO_4$ treatment typically leaves substantial uranium and/or other radionuclide values in the digest residue. It becomes apparent therefore, that the principal objectives of this prior procedure are quite different from applicant's and, as will become more evident hereinafter, necessitate the use of procedures and steps such as the onerous HF recovery which applicant's novel process has obviated.

In U.S. Pat. No. 5,084,253 the metal niobium is separated from uranium by means of a mineral acid digestion of an alloy of the metals, wherein fluoroboric acid is added to facilitate $U^{+4}$ production using lower concentrations of HCl. After the insoluble niobium oxides have been separated from the digest liquor, the $U^{+4}$ ion is precipitated with HF to give the insoluble $UF_4$ green cake. This process does not have to be concerned with the problems associated with a substantially concurrent recovery of uranium and fluorine values from a common waste material or ore source, and thus, can accommodate the green cake formation. It is particularly noted that the process of this patent takes measures to avoid the formation of the uranyl ion, the presence of which as will be seen hereinafter, is important to Applicant's process.

Principal objects, therefore, of the present invention are to provide a markedly simplified process for the recovery of substantial fluorine and radionuclide values, particularly uranium and thorium values, from ore leach residues or the like, wherein the need for handling gaseous HF is obviated and wherein substantially all of said values are substantially concurrently released to the digest liquor; to provide such process which is exceptionally efficient in removing radionuclide values from ore processing waste material such that chemical waste rather than nuclear waste status is achieved for the final discard; to provide such process which readily provides a feed material of high fluorine content and very low radionuclide content for conversion of the fluorine to non-gaseous, purified chemical intermediate materials; and to provide an improved process for the production of $AlF_3$ from fluorine containing ores or their processing tailings or wastes.

SUMMARY OF THE INVENTION

These and other objects hereinafter appearing have been attained in accordance with the present invention which, in a principal embodiment, is defined as a process for converting feed materials of high mineral content and substantial radioactivity levels to concentrated radionuclide products of high radioactivity levels and to other products or discard of very low radioactivity levels, wherein said feed materials contain substantial fluorine values and radionuclide values assaying above about 30 pCi/g, said process comprising contacting said feed materials with an acidic aqueous digest medium containing boric acid and an acid component comprising one or more other mineral acids, the ratio of said medium (L) to said feed materials (Kg) on dry basis ranging from about 1/1 to about 20/1, preferably from about 2/1 to about 6/1, the total concentrations of all of said acids being sufficient to solubilize said values at commercially acceptable rates, the molar ratio of said acid component to said boric acid charged to said digest medium being from about 20 to about 0.5, said contacting being carried out for a period of time sufficient to solubilize said values into a digest liquor, separating said radionuclide values from said digest liquor to give concentrated, substantially purified radionuclide values, and contacting the resulting first raffinate liquor with cation reactant to form and precipitate fluoride salt product, said salt product, the resulting second raffinate liquor, and said first raffinate liquor each having a radionuclide values assay of less than about 20% of the radioactivity level of said feed material.

In certain preferred embodiments:

(1) said feed materials comprise ore leach residues containing substantial calcium fluoride matrices, the said acid component contains sulfuric acid in sufficient quantities to precipitate substantially all calcium ions as digest residue, wherein said digest liquor is separated from said residue, and wherein said residue has a radionuclide values assay of less than about 30 p Ci/g;

(2) said feed materials contain substantial metal fluoride values, wherein said acid component comprises one or both of nitric acid and hydrochloric acid and wherein said first raffinate liquor is contacted with sulfuric acid to form and precipitate metal sulfates having a radionuclide values assay of less than about 30 p Ci/g;

(3) the metals of said sulfates of (2) above comprise at least calcium, zirconium, iron and manganese.

(4) the molarity of each of said boric acid and said acid component is above about 0.5, and the aqueous system is heated to a temperature of from about 75° C. to about 100° C. for a period of from about 0.5 to about 10.0 hours;

(5) the molarity of said acid component is higher than the molarity of said boric acid;

(6) the said feed materials are redigested one or more times in fresh acidic aqueous systems to solubilize the more intractable values;

(7) the initial molar ratio of other mineral acid to boric acid charged to said acidic aqueous system is from about 1.0 to about 10;

(8) the solubilized uranium values are separated from said digest liquor by passing said liquor through a chelating ion exchange column;

(9) the process of above embodiment (1) wherein said feed materials contain significant tantalum and/or niobium values, the said digest medium contains sulfuric acid/boric acid in sufficient quantities to produce a residue concentrated in tantalum and niobium values, and wherein the residue contains reduced radionuclide values, most notably uranium and thorium.

BRIEF DESCRIPTION OF THE DRAWINGS

The invention will be further understood from the drawings herein, wherein.

DETAILED DESCRIPTION OF THE INVENTION

Figure 1:
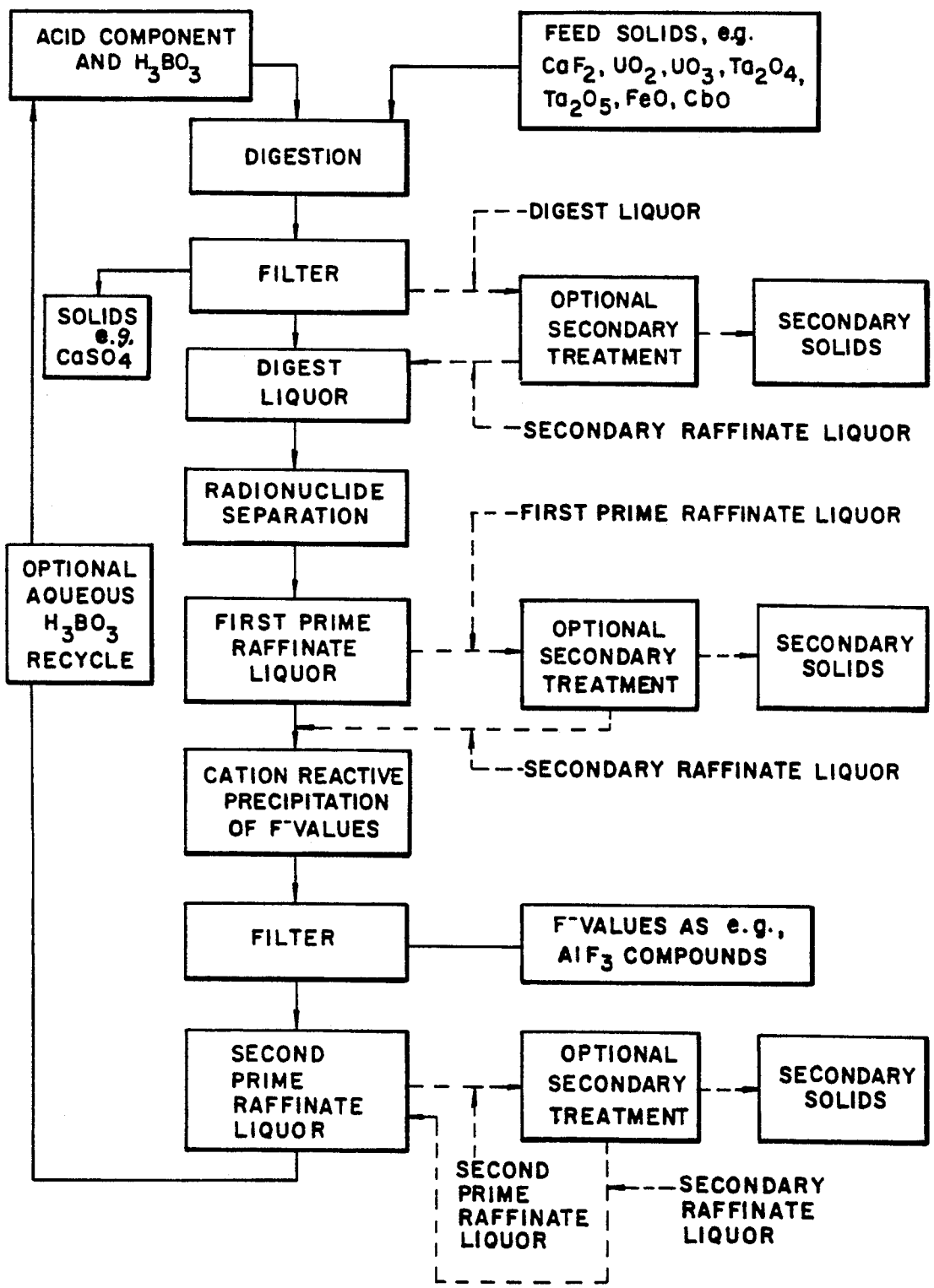
FIG. 1 is a schematic flowsheet for the present overall process.

As indicated above, the invention concerns a process especially suited for removing valuable metal, fluoride, and radionuclide values from a feed material of high mineral content in which the metals and radionuclides are present as substantially water insoluble fluorides or are trapped within a metal fluorine matrix which is substantially insoluble in chemical reactant systems. FIG. 1 is a basic, greatly simplified, but entirely operable schematic for the present overall process in one of its preferred embodiments. The process as shown in FIG. 1 comprises a mineral acid/boric acid leach or digestion wherein at least the fluorides and radionuclides are placed in solution in a digest medium, a filtration system for removing any remaining insoluble material, a separation step where solubilized metal values, radionuclide values, and contaminants are removed by specific extraction, precipitation, ion-exchange, or the like procedures, and a basic digest of the first raffinate liquor wherein the fluorine values are converted to fluoride product precipitate, a filtration system for recovery of said fluoride product, and if desired recycle of the second raffinate liquor containing recycle $H_3BO_3$ back to the digest medium.

The present process can be applied to the efficient recovery of strategic metals including, but not limited to, transition, lanthanide, and actinide series metals from metal-fluoride matrices. Examples of these matrices include calcium fluoride sediments from wastewater treatment operations or from leach ore residues which contain calcium aluminum fluoride materials from primary metal production operations. The focus of the present invention is on the leaching or dissolution reaction in which the feed materials are reacted with chemical reagents under controlled conditions of time and temperature. These chemical reagents are selected to enhance the effective dissolution of the matrix directed to optimizing the release of certain metal species and providing a resulting liquor that may be treated for the efficient recovery of metal values and fluoride or fluorine values.

Typically in the past, metal-bearing fluoride compounds resulting from residues and sediments described above have been treated with mineral acids such as $H_2SO_4$, at high temperatures to dissolve or mobilize metals existing as insoluble metal-fluorides. Recovery of these metals is desirable for revenue value or for the purpose of decontaminating solids, i.e., the removal of uranium and thorium, in order to eliminate the premium charged for radioactive waste disposal. For example, when calcium fluoride sediments are reacted with sulfuric acid, a calcium sulfate (gypsum) material and a metal-rich $HF/H_2SO_4$ liquor are produced. The liquor is first separated from the solids and then processed to extract the metal species. The resulting residual solids are evaluated for chemical content and either redigested to remove addition metal species or discarded. Typically, such a digestion leaves considerable radionuclide values in the residual solids.

The present process uses boric acid as a strong complexing agent in a sulfuric acid leaching system for the digestion of a metal fluoride matrix. Preferably stoichiometric amounts of sulfuric and an excess of boric acid contact the metal fluoride matrix within fairly wide ranges of temperature and reaction times. The boric acid apparently forms a very stable complex with the fluorine in the matrix during the digest or leaching reaction, for example, with calcium fluoride according to the reaction (1) 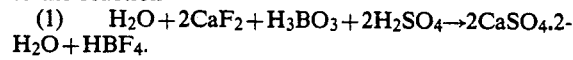

Figure 3:
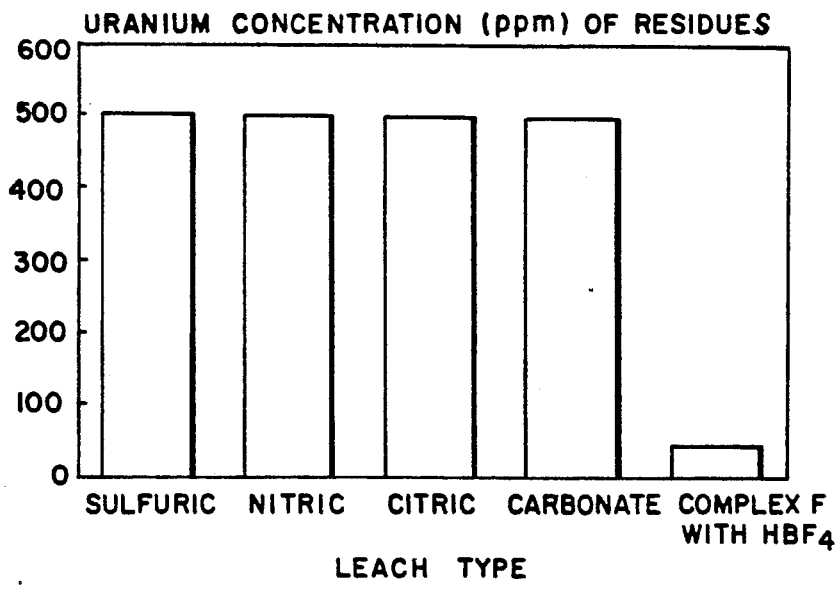
FIG. 3 is a graph which compares the uranium values leaching effectiveness of various digest agents versus the present mineral acid/boric acid, digest medium. This graph gives typical leaching results under conditions which were selected to maximize uranium values recovery for each digest medium.

FIG. 3 hereof provides a comparison of leaching efficiencies for various chemical reagents alone versus the present complexation with boric acid, particularly, $H_2SO_4/H_3BO_3$.

After the desired metals are extracted from the resulting $HBF_4$ containing liquor, particularly the radionuclides, e.g. using ionexchange, solvent extraction, or selective precipitation, the resultant raffinate liquor may then be treated to recover fluorine values. This can be achieved, for example, by the preferred end reaction (2) 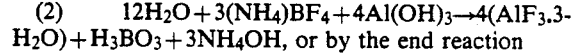

or by the end reaction (3) 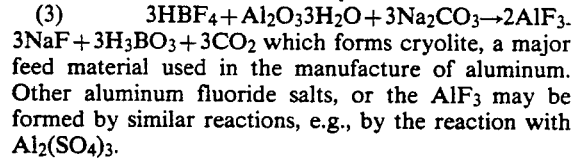

which forms cryolite, a major feed material used in the manufacture of aluminum. Other aluminum fluoride salts, or the $AlF_3$ may be formed by similar reactions, e.g., by the reaction with $Al_2(SO_4)_3$.

With respect to the digest process, several factors influence the choice of the mineral acid, including the chemical composition of materials to be leached, the type of separation system to be used to remove metal values or contaminants from the leach liquor, and values recovery cost. In this regard, the mineral acid must form soluble salts with the components of interest and be compatible with the extraction or other separation system of choice. For example, sulfuric acid is typically used if uranium is the component of interest because it forms a soluble salt, is low in cost, and is compatible with several extraction techniques. If radium is the component of interest, radium forms insoluble sulfate salts, and therefore, hydrochloric or nitric acid would be the mineral acid of choice.

The amounts of mineral and boric acids will vary with the feed composition. The mineral acid is typically added in sufficient excess to transmute to soluble species and hydroxides or carbonates present in the mineral feed material, to achieve an acid molarity of at least about one normal, and to neutralize hydroxyl ions formed from the complexation reaction of the fluoride species with the boric acid. The complexation reaction proceeds according to the equation, $2CaF_2H_2O + H_3BO_3 + 2H_2SO_4 \rightarrow HBF_4 + 2H_2O + 3H_2O$. A 25-50% excess of the stoichiometric amounts of boric acid required to complex the fluoride in the mineral material preferably is used and sufficient water is added to maintain the boric acid concentration in the one molar range. A pH<1 is preferred for this reaction. This preferred molarity is based on the solubility of boric acid at room temperature. Less water can be utilized if sufficient temperatures are maintained throughout the process to maintain the boric acid in solution.

The mineral materials feed is typically leached for two to four hours at about 80°-95° C., although temperatures of from about 60° C. or lower, to about 115° C. or higher are useful. Dependent on the feed material composition, leaching times of up to twelve or more hours may be required, and for particularly refractory materials, multiple leaches may be expedient.

Following the leaching or digestion process, the leach liquor is filtered to remove any insoluble components. The solids are washed with water or with acidified water to remove any residual mineral acid and boric acid from the filter cake. The wash is combined with the filtrate and the liquor is sent to one or more separation operations for the selective removal of metal values or contaminants. The types of separation operations employed will vary depending on the mineral feed material, the mineral acid used, and the metals or radionuclides to be recovered. However, in all cases, an ammonium hydroxide precipitation of contaminant metals is preferred and is performed prior to the aluminum reactant digestion used for production of aluminum fluoride, as shown above.

Figure 2:
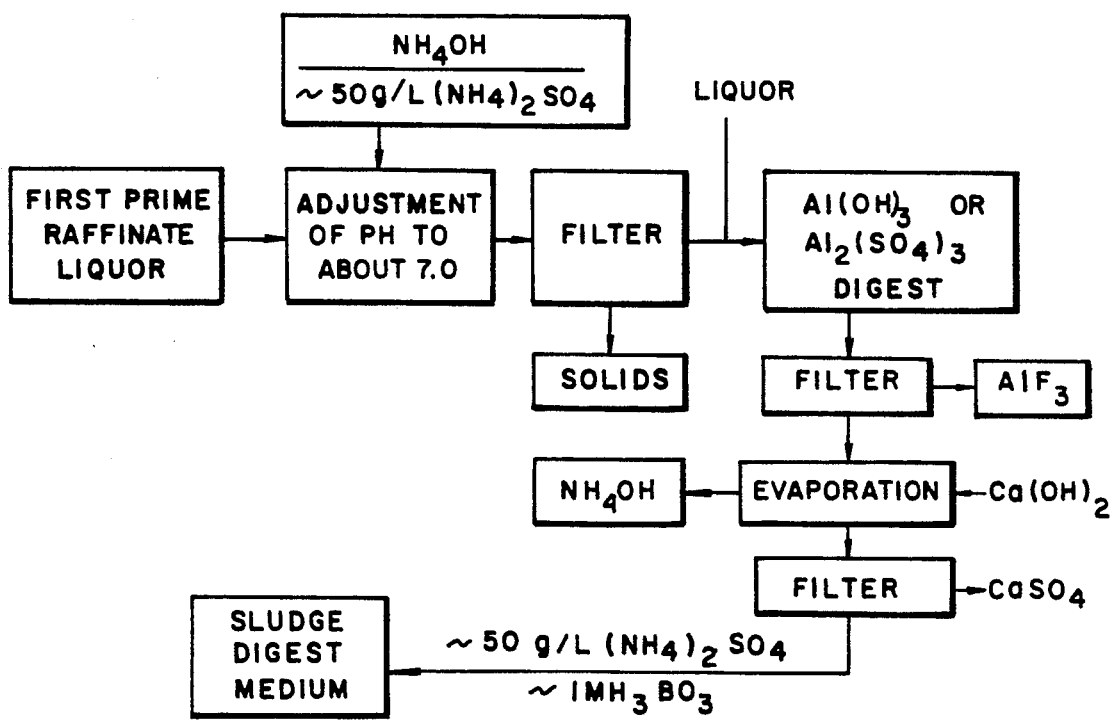
FIG. 2 is a schematic flowsheet of preferred embodiments of fluorine values recovery.

Following removal of metal contaminants, the process liquor, in one embodiment of $AlF_3$ production as shown in FIG. 2, is digested for 30 minutes to 1 hour with aluminum hydroxide under pressure, at about 150° C. The aluminum hydroxide is added as a solid at about 95% of the stoichiometric quantity required per the equation, $12H_2O + 4Al(OH)_3 + 3NH_4BF_4 \rightarrow 4AlF_3 \cdot 3H_2O + 3H_2O + 3H_3BO_3 + 3NH_4OH$. After digestion, the aluminum fluoride product is filtered, the filter cake is washed with water to remove residual ammonium salts and boric acid, the wash is combined with the filtrate, the resultant liquor is returned to the leaching process, and the aluminum fluoride filter cake is calcined at about 250° C. to remove the waters of hydration and provide a more acceptable product for sale.

The above FIGS. 1 and 2 show the principal steps of digestion, radionuclide separation, and fluoride values recovery and their sequence in the present processes, and also indicate at what stage in the process the first, second, third, etc., raffinate liquors referred to in the claims occur. In this regard, the numerical designations of these raffinate liquors do not signify that they are the only raffinates that can and will be produced in carrying out the present process on a commercial basis and with commercial equipment. These designations do, however, represent principal stages which constitutes the present process. For example, formation of the first raffinate liquor, i.e., the solution remaining after separation of the radionuclides from the digest liquor can be preceeded by any number and composition of secondary raffinate liquors which may result from any number and types of secondary treatments of the digest liquor prior to the principal step of separating out said radionuclide values. Such secondary treatments, e.g., may comprise specific chemical precipitations, solvent extractions, aqueous or chemical washings, filtrations, centrifugations, settlings, or the like designed to remove specific elements, compounds or impurities from the digest liquor. A specific example is the optional secondary removal of zirconium from the digest liquor by means of ammonium hydroxide precipitation prior to separation of the radionuclide materials from the liquor. Such a precipitation of zirconium compound would produce a secondary raffinate, however, the principal character of the digest liquor, i.e., as containing the principal fluorine and radionuclide values would not be altered and the designation of "first raffinate liquor" would still be viable since it resulted from digest liquor containing the said principal values of interest. This same analysis or characterization holds also for the other designated principal raffinates and the aforementioned secondary treatments may be employed, if desired, anywhere along the process, e.g., as preparatory to or subsequent to precipitation of fluoride salt product.

The various ores, per se, to which the present process is applicable include, for example, a typical tantalite ore which may contain from about 20% to about 50% tantalum and from about 1% to about 10% columbium, and a columbite ore which may contain from about 3% to about 20% tantalum and from about 10% to about 30% columbium. Eastern (Malaysian) tin slags may contain, e.g., 2% to 5% of each metal, while African tin slags may contain, e.g., 5% to 15% each. Impurities in tin slags typically include CaO (5-20%), $SiO_2$ (10-40%), FeO (5-20%), $TiO_2$ (5-15%), $Al_2O_3$ (5-10%), $ZrO_2$ (1-5%), and various other minor elements and usually include significant thorium and uranium values.

A specific example of a feed material useful for the present invention are actual tantalum ore tailings, the residue analyses of which, as determined by neutron activation analysis (NAA), inductively coupled plasmaspectrophotometry (ICP), and wet chemistry techniques are shown in Table I. An X-ray diffraction analysis (XRD) of the tailings showed the prominent compounds to be $Ca_{12}Al_2Si_4(SO_4)_3F_{40}$ and $Ca_3Al_2(Ce)SO_4F_{13}$, with $CaF_2$ and $SiO_2$ also being detectable. Other elements in trace amounts typically are present also.

TABLE 1

| Element | Percent | Element | Percent |
|---------|---------|---------|---------|
| Al | 4.7 | Sc | 0.24 |
| Ca | 14.7 | Si | 2.0 |
| Ce | 0.95 | $SO_4$ | 3.6 |
| F | 32.7 | Ta | 1.59 |
| Fe | 1.02 | Ti | 1.99 |
| Mg | 1.05 | Th | 0.50 |
| Mn | 0.35 | U | 0.12 |
| Na | 1.96 | V | 0.11 |
| Nb | 1.68 | Zn | 0.02 |
| Ni | 0.06 | Zr | 1.78 |
| Pb | 0.05 | | |

The sludges remaining after HF digestion of the ores, slags or concentrates are primarily unreacted materials, insoluble fluoride salts, and hydrofluoric acid-containing digestion liquors. A typical sludge stream remaining after digestion contains about 30% to 60% moisture and, on a dry-weight basis, up to about 3.6% tantalum, up to about 3.0% columbium, up to about 1% uranium, up to about 1% thorium, and up to about 40% fluorides. On dry basis, the sludge weight is about 25% to 75% of the initial input solids weight depending on the origin of the feed materials.

The following examples will further illustrate practice of certain embodiments of the invention, wherein all percentages are by weight unless otherwise specified and all metal concentrations are based on elemental weight thereof.

EXAMPLE A

Processing of Uranium-Contaminated Calcium Fluoride

A calcium fluoride sludge resulting from the treatment of the process effluent stream from a $UF_6$ production facility with lime was processed in accordance with the present invention, the stated component percentages or concentrations being approximate. The sludge consisted of 40% water and 60% solid material. The composition of the solid material was 90-95% calcium fluoride, 5% lime and trace metal hydroxides, and 1600 ppm U. The sludge was leached with a 5% excess of sulfuric acid and a 25% excess of boric acid. The purpose of the leach was to extract the fluoride and uranium from the sludge and leave a calcium sulfate leach residue that could be landfilled.

In carrying out the above, a quantity of 140 g of calcium fluoride sludge was digested in a solution of 105 g of concentrated sulfuric acid, 300 ml of water, and 38 g of boric acid for 3 hours at 90°-95° C. The digest solution was filtered and the calcium sulfate filter cake was washed with two 50 ml aliquots of water. The filter cake was dried at 105° C. and assayed for water and ppm uranium. The cake contained 43% water and 15 ppm (10 pCi/g) U on a dry weight basis. Following filtration, the digest liquor was diluted and analyzed. This liquor contained approximately 139 mg/L of U, 10 g/L of sulfate, and 6.68 g/L of boron as $H_3BO_3$. Based on these results, 99+% of the U was digested, 90% of the sulfuric acid was consumed, and 99+% of the boric acid was recovered.

EXAMPLE B

Benefaction of Ta/Nb Ore Residues

Tantalum and niobium ore residues containing, e.g., 1-2 wt % of each component may be benefited by the present process. Typically, the tantalum and niobium in the ore residues are contained in a refractive iron/manganese matrix. This, plus the fact that the metals are at low concentrations, makes direct processing economically unattractive. The present strong mineral acid/boric acid combination attacks the insoluble radionuclide fluorides and mobilizes them into the digest liquor where they can be extracted, or otherwise isolated, thereby providing a residue with markedly reduced radionuclide values. In addition, the residue is beneficiated in tantalum and niobium concentrations in that a large fraction of other components are efficiently solubulized into the digest liquor, leaving behind, in the residue, tantalum and niobium concentrations that are approximately 10-fold greater than in the starting material.

While sulfuric acid/boric acid may be used, the selection of nitric acid and boric acid is preferred when calcium and radium need to be removed from the ore residues. Nitric acid/boric acid combination is the preferred selection to provide a residue with lower radioactivity and higher tantalum and niobium values than normally achievable with sulfuric acid/boric acid combination. In this regard, in a pure acid system, some fraction of the tantalum and niobium in the fluoride-bearing residues will be mobilized to the digest liquor as fluoride complexes. The use of sulfuric acid alone mobilizes a large fraction of tantalum and niobium in some sludges, but only a minimal concentration of tantalum and niobium in others. Since boron reacts strongly with fluoride in the sludge, the tantalum and niobium cannot readily mobilize as soluble fluorides and therefore remain as insoluble compounds in the ore residue as a result of the present process.

Processing of Ta/Nb Ore Processing Residue

A sludge (wet residue) resulting from the digestion of a Ta/Nb ore in HF and sulfuric acid was processed in accordance with the present invention using a two-stage digest. The sludge contained approximately 52% water and the dried sludge (residue) consisted approximately of 20-25% F, 15% Ca, 6% Al, 5% Zr, 3% Ti, 2% Fe, 1% Ta, 1% Nb, 0.6% Mn, 0.4% Th, 0.2% U, 0.2% Sc, and contained 400 pCi/g Ra-226. The Ta and Nb were present in the sludge in a refractory iron/manganese containing matrix. The bulk of the remaining sludge components were present as insoluble fluoride species.

Because of the insolubility of the calcium and radium sulfate, nitric acid was selected as most appropriate for the aforesaid other mineral acid. In accordance with the present invention, 210 g of the raw sludge was digested in a two-stage, countercurrent, continuous fashion with 120 ml of concentrated nitric acid, 30 g of boric acid, and 300 ml of water. The digestion times and temperatures for each of the two stages were 4 hours and 80°-90° C., respectively. In typical countercurrent fashion, the digest residues left from the first stage were contacted with fresh digest solution in a second stage. The second digest solution was then used to contact the raw sludge. Residues from the first digest were transferred to the second digest vessel by filtering the digest leach solution and transferring the filter cake to the second digest vessel. Following the second digest, the second digest solution was filtered and the digest residues were washed with approximately 50 ml of 0.1 molar nitric acid. The wash solution was combined with the digest solution and both were transferred to the first digest vessel along with 210 g of raw sludge.

After completion of the second digest, the residues thereof were dried and assayed. These residues typically weighed approximately 5 grams and consisted of approximately 50% Ta/Nb oxides. Essentially 95% of the remaining sludge constituents were solubilized into the first digest liquor including the Sc, Th, U, and Ra-226. The combined digest and wash liquors counted about: 200 pCi/ml total uranium; 25 pCi/ml thorium; 70 pCi/ml radium-226; and contained 230 mg/L of scandium.

EXAMPLE C

Uranium Extraction and Recovery from Calcium Fluoride Digest Liquors

The liquor and combined washes obtained from the digestion of calcium fluoride sludge illustrated in Example A were used in this experiment and contained approximately 130 mg/L total uranium as a solution approximately 0.4N in fluoroborate ion at a pH of about 0.5. It is noted that in carrying out the present process, the initial digest pH is typically between about 0.0 and about 3.0, and preferably is from about 0.5 to about 1.5. Extraction of the uranium was performed by using an iminodiacetate ion-exchange resin SR-5, manufactured by Sybron/Ionac Chemicals. Ten cc of SR-5 with standard particle size distribution $-16+50$ Standard U.S. Mesh were loaded into a laboratory column. This column was treated with 1M sulfuric acid and subsequently rinsed until the effluent had reached a pH of 2.6. The uranium-bearing digest solutions were adjusted to pH of 2.8 with 10 N sodium hydroxide and fed to the column at an average flow-rate of four bed volumes (BV) per hour. The column effluent was periodically sampled and analyzed for total uranium by a laser induced phosphorescence method as described in an article by B. A. Bushaw, entitled *"Progress In Analytical Spectroscopy"*, proceedings vol. 26, Oak Ridge Conference On Analytical Chemistry In Engineering Technology, Knoxville, Tenn., Oct. 1983. Through fourteen BV of solution processed, the leakage of uranium in the effluent was $<3\%$, and through 30 BV of liquor processed, approximately 91% of uranium in the feed solution, i.e., 36.0 mg of radionuclide, was extracted by the SR-5.

Uranium was then recovered from the loaded laboratory column. For this recovery, the column was first rinsed with 20 ml of deionized water to displace uranium from the void volume. The elution of uranium from the ion-exchange resin was performed by passing a 2 N nitric acid solution through the column and collecting the eluent in 20 ml increments at about 4 BV/hr. The total uranium analysis in the eluent fraction was performed by a laser induced phosphorescence method. Analysis of a total of eight BV of eluent collected showed that essentially 100% of the uranium values were stripped from the column.

Methods For Radiometric Analyses

For the analyses of radionuclides, two types of methods exist i.e., destructive and non-destructive techniques. For the destructive technique, the sample matrix is converted to a form where the target nuclide may be selectively isolated and analyzed. For the non-destructive technique, the sample matrix is assayed for target nuclides without destroying or converting the matrix.

Uranium was assayed in several ways. For the calcium fluoride testing, when uranium was in a solid matrix, this matrix was digested and the resulting digest solution was analyzed by kinetic phosphorescence. In this technique, a chemical is added to the liquid to complex with the uranium. This complex is excited with a laser which causes it to phosphoresce. The decay of the intensity of the phosphorescing species or complex is followed and plotted over time. Extrapolation of the curve to $t=0$ provides the concentration of the uranium. When liquids are analyzed, as from ion-exchange processing or in the mother liquor, the dye is added directly.

Thorium was measured by Inductively Coupled Plasma Spectroscopy (ICP). Thorium measurements in solids, e.g. digest residues, first requires complete digestion of the residue to produce a liquid, and the thorium analyses in the liquor is performed directly by ICP. Uranium in leach residues has also been measured by ICP following acid digestion of the residues.

Radium analyses were performed by gamma spectroscopy. In this non-destructive method, the gamma rays emitted from either the radium or from its daughter products are collected and assayed and then related to the total radium concentration. Pre-treatment of the sample prior to assay is not required by this measurement technique.

Other useful analytical methods include:

| | |
|---|---|
| Metals | Atomic Adsorption or ICP; |
| Fluorides | Selective Ion Electrode; |
| Fluoroborates | Selective Ion Electrode or Gravimetric using lime addition; |
| Nitrates | Selection Ion Electrode. |

Ionac SR-5 is a macroporous chelating resin based on iminodiacetic acid functionally for the selective recovery of heavy metal ions from waste treatment streams and process liquids. The resin is designed to stand up to the harsh conditions of waste and process applications. Resin attrition is minimal due to the rugged, second-generation macroporous polymer backbone and the very low (approximately 20%) reversible swelling. The general specifications of this resin are as follows:

| | |
|---|---|
| Polymer Structure | Styrene-Divinylbenzene Copolymer |
| Functional Groups | Iminodiacetic Acid |
| Physical Form | Moist Spherical Beads |
| Ionic Form (as shipped) | Sodium |
| Selective Copper Capacity (Na form) | 1.7 moles/l |
| Reversible Swelling (H to Na) | 20% (approx.) |
| Shipping Weight | 45 lbs/cu. ft (720 g/l) |
| Particle Size Distribution (wet) | |
| (U.S. Std. Mesh) | $-16 + 50$ |
| (Metric) | $0.3 - 1.2$ mm |
| Effective Size (mm) | $0.47 - 0.53$ |
| Uniformity Coefficient | 1.7 Maximum |
| Water Retention | 45–50% |
| pH Range (Stability) | 1–14 |
| Solubility | Insoluble in all common solvents |

Further details of this resin are found in the sales literature, 5 pages, of Sybron Chemicals Inc., of Birmingham, N.J., entitled IONAC Selective Metal Recovery.

EXAMPLE D

Recovery of Fluorine Values As Aluminum Fluoride

Two processes for the preparation of high-quality aluminum fluoride from calcium fluoride leach liquors as prepared above, were developed. Both processes follow the general flowsheet presented in FIG. 2. It is particularly noted that heretofore, aluminum trifluoride has been produced mainly by the reaction of HF with aluminum hydroxide, which process requires the very costly HF reactant as well as the extraordinary equipment and handling precautions associated with HF.

In the present process #1, aluminum is added as alumina trihydrate, $Al(OH)_3$, to leach liquor from which incidental or trace metallic impurities have been removed by precipitation with ammonium hydroxide. The $Al(OH)_3$ digestion is carried out at a temperature of about 180° C. and a pressure of about 200 psi for thirty minutes in a teflon bomb.

In the present process #2, after removal of incidental or trace metallic impurities from the leach liquor by hydroxide precipitation, aluminum sulfate is added to the leach (raffinate) liquor and the digestion carried out for approximately 4 hours at about 90°–95° C. Ammonium hydroxide is added periodically throughout the digestion period to neutralize any free acid such as H₂SO₄ formed during the reaction of ammonium fluoroborate with aluminum sulfate. The following equations show the end chemical reactions for each process wherein stoichiometric quantities of the reactants are preferably employed.

Process #1

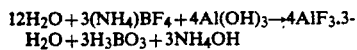
12H₂O+3(NH₄)BF₄+4Al(OH)₃→4AlF₃.3-
H₂O+3H₃BO₃+3NH₄OH

Process #2
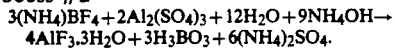
3(NH₄)BF₄+2Al₂(SO₄)₃+12H₂O+9NH₄OH→
4AlF₃.3H₂O+3H₃BO₃+6(NH₄)₂SO₄.

In carrying out the above processes, the aluminum fluoride is filtered and washed with water to remove boric acid and sulfate contamination. The aluminum fluoride filter cake is then calcined to remove water and is then ground to meet particle-size specifications. The digestion liquor is treated with lime and the ammonium hydroxide recovered. The calcium sulfate resulting from this lime treatment is filtered and washed with water to remove boric acid contamination and the liquor and wash water then returned to the CaF₂ leaching process for reuse. It is noted that the extremely efficient recovery of the boric acid is a very valuable and unexpected aspect of these processes.

Process #1

A synthetic leach liquor was prepared to evaluate process #1. The leach liquor was prepared by adding 91.5 g of 48% fluoroboric acid, 7.73 g of boric acid, and 25 g of (NH₄)₂SO₄ to a 500 ml volumetric flask and diluting to 500 ml with demineralized water. This resulted in a synthetic leach liquor containing 1 molar fluoroboric acid, 50 g/L ammonium sulfate, and 0.25 molar boric acid which is typical of a calcium fluoride leach liquor. A 50 ml aliquot of the synthetic leach liquor was neutralized with approximately 3.3 ml of concentrated ammonium hydroxide to pH 7.0. This solution was placed in a 100 ml teflon digestion bomb and 5 g of aluminum hydroxide was added. Only 95% of the stoichiometric quantity of the aluminum hydroxide was added to insure that aluminum consumption went to completion. The teflon bomb was sealed and the contents were digested by placing the bomb in a microwave and heating for 30 minutes at 150° C., the pressure reaching about 40 psi. The bomb was then heated at 180° C. for another 30 minutes, the pressure reaching 130 psi. After cooling, the contents of the bomb were filtered, the filter cake was washed with approximately 50 ml of water and the cake dried at 105° C. After drying, the cake was analyzed to determine its aluminum and fluoride values. The analytical results showed that about 92% of the fluoride was recovered as aluminum fluoride trihydrate.

Process #2

An actual calcium fluoride leach liquor was utilized to evaluate the process #2. An aliquot of 920 ml of leach liquor containing 0.25 mole/L fluoroboric acid, 0.08 mole/L boric acid and 0.2 mole/L sulfuric acid was placed in a one L glass beaker and 87 g of Al₂(SO₄)₃.18H₂O was added and the solution stirred until all of the aluminum sulfate dissolved. The solution was adjusted approximately to a pH=8 with ammonium hydroxide and the beaker placed on a hot plate, stirred, and heated for 4 hours at 90°–95° C. The pH was periodically adjusted during the 4 hour digestion period with ammonium hydroxide to maintain a pH greater then 7.0. Following the digestion period, the solution was filtered and the filter cake was washed with approximately 50 ml of demineralized water to remove boric acid and ammonium sulfate contamination. After washing, the filter cake was dried at 105° C. and analyzed to determine its aluminum and fluoride values. The analytical results showed that the filter cake consisted of aluminum fluoride trihydrate.

The invention has been described in detail with particular reference to preferred embodiments thereof, but it will be understood that variations and modifications will be effected within the spirit and scope of the invention.

I claim:

1. The process for converting feed materials of high mineral content and substantial radioactivity levels to concentrated radionuclide products of high radioactivity levels and to other products or discard of very low radioactivity levels, wherein said feed materials contain substantial fluorine values and radionuclide values assaying above about 30 pCi/g, said process comprising contacting said feed materials with an acidic aqueous digest medium containing boric acid and an acid component comprising one or more other mineral acids, the ratio of said digest medium (L) to said feed materials (Kg) on dry basis ranging from about 1/1 to about 20/1, the total concentrations of all of said acids being sufficient to solubilize said values at commercially acceptable rates, said contacting being carried out for a period of time sufficient to solubilize said values into a digest liquor, separating said radionuclide values from said digest liquor to give concentrated, substantially purified radionuclide values, and contacting the resulting first raffinate liquor with cation reactant to form and precipitate fluoride salt product, and to provide a second raffinate liquor, each of said salt product and second raffinate liquor having a radionuclide values assay of less than about 20% of the radioactivity level of said feed materials.

2. The process of claim 1 wherein said radionuclide values mainly consist of uranium, and wherein said acid component is comprised of at least about 50 weight % of sulfuric acid.

3. The process of claim 2 wherein said feed materials contain substantial amounts of calcium fluoride.

4. The process of claim 3 wherein said sulfuric acid is present in sufficient quantities to precipitate substantially all calcium ions as CaSO₄ residue, wherein said digest liquor is separated from said residue, and wherein said residue has a radionuclide values assay of less than about 30 pCi/g.

5. The process of claim 1 wherein said acid component comprises one or both of nitric acid or hydrochloric acid, and wherein the substantially radionuclide-free first raffinate liquor is contacted with sulfuric acid to form and precipitate metal sulfates having a radionuclide values assay of less than about 30 pCi/g.

6. The process of claim 5 wherein the metals of said sulfates comprises calcium, zirconium, iron or manganese.

7. The process of claim 1 wherein the molarity of each of said boric acid and said acid component is above about 0.5, and said digest medium is heated to a temperature of from about 75° C. to about 100° C.

8. The process of claim 1 wherein the molarity of said acid component is higher than the molarity of said boric acid.

9. The process of claim 1 wherein said feed materials comprise ore digestion residue and is contacted at least twice with substantially fresh digest medium to solubilize the more intractable fluorine and radionuclide values.

10. The process of claim 2 wherein the initial molar ratio of $H_2SO_4/H_3BO_3$ charged to said digest medium ranges from about three to about one.

11. The process of claim 1 wherein said radionuclide values comprise substantial uranium values, which values are separated from said digest liquor by passing said liquor through a chelating ion exchange column.

12. The process of claim 1 wherein said second raffinate liquor contains at least about 75% of the initial boric acid charge to said acidic aqueous system.

13. The process of claim 12 wherein said second raffinate liquor is recycled to the same or to a separate digest medium for contacting feed materials.

14. The process of claim 1 wherein said first raffinate liquor is contacted with at least one acid soluble aluminum compound to form and precipitate aluminum fluoride material.

15. The process of claim 14 wherein said second raffinate liquor is recycled to the same or to a separate digest medium for contacting feed materials.

16. The process of claim 1 wherein said first raffinate liquor is contacted with basic material to adjust the pH thereof to above about 7.0, and wherein said cation reactant is selected from $Al(OH)_3$ or $Al_2(SO_4)_3$.

17. The process of claim 16 wherein said basic material is $NH_4OH$.

18. The process of claim 17 wherein from about 30 to about 70 grams of $(NH_4)_2SO_4$ are added to each liter of first raffinate liquor prior to the addition of said cation reactant thereto.

19. The process of claim 18 wherein said second raffinate liquor is contacted with sufficient calcium hydroxide to precipitate substantially all sulfate ion as calcium sulfate, to release substantially all ammonium ions as $NH_4OH$, and to convert substantially all fluoroborate moieties to boric acid.

20. The process of claim 19 wherein said $NH_4OH$ is separated from the resulting liquor to provide a third raffinate liquor which comprises a substantially purified aqueous boric acid system containing at least about 90% of the initial boric acid charge to said digest medium.

21. The process for converting hazardous liquid or solid ore treatment residuum of high mineral content to valuable non-hazardous products or discard, wherein said residuum contains substantial fluorine values and total uranium values assaying above about 30 pCi/g, said process comprising contacting said residuum at from about 70° C. to about 130° C. with an acidic aqueous system containing boric acid and an acid component comprising one or more other mineral acids, the ratio of said system (L) to said residuum (Kg) ranging from about 2/1 to about 20/1, the total concentrations of all of said acids being sufficient to maintain said values in a solubilzed form in a digest liquor, separating substantially all of said uranium values from said digest liquor, and contacting the resulting first raffinate liquor with cation reactant to form and precipitate fluoride salt product and provide a first raffinate liquor, said salt product and said first raffinate liquor both having radionuclide values assays of less than about 30 pCi/g.

22. The process of claim 21 wherein said acid component contains sulfuric acid.

23. The process of claim 22 wherein said waste material contains substantial calcium fluoride and said sulfuric acid is present in sufficient quantity to precipitate substantially all of the calcium as calcium sulfate material.

24. The process for recovering boron values and fluorine values from an acidic aqueous feed liquor containing substantial fluoroborate moieties, comprising contacting said feed liquor with basic material to adjust the pH thereof to above about 7.0 and provide a first clarified liquor containing said fluoroborate moieties, and contacting said first clarified liquor with sufficient cation reactant selected from $Al(OH)_3$ or $Al_2(SO_4)_3$ to precipitate substantially all of said fluorine values as an aluminum fluoride compound and provide a second clarified liquor containing said boron values as boric acid.

25. The process of claim 24 wherein said basic material is $NH_4OH$.

26. The process of claim 25 wherein from about 30 to about 70 grams of $(NH_4)_2SO_4$ are added to each liter of said feed liquor.

27. The process of claim 26 wherein said second clarified liquor is contacted with sufficient calcium hydroxide to precipitate substantially all sulfate ion as calcium sulfate and to release substantially all ammonium ions as $NH_4OH$.

28. The process of claim 27 wherein said $NH_4OH$ is separated from said second clarified liquor to provide a recycle liquor which comprises a substantially purified aqueous boric acid system containing at least about 90% of the boron values of said feed liquor.

* * * * *